Patented July 30, 1946

2,404,817

UNITED STATES PATENT OFFICE 2,404,817

PRODUCTION OF COPOLYMERS OF MONO-ETHENOID COMPOUNDS

Daniel E. Strain, Wilmington, Del., assignor to E. I. du Pont de Nemours & Company, Wilmington, Del., a corporation of Delaware No Drawing. Application August 19, 1941, Serial No. 407,416

7 Claims. (Cl. 260—84)

This invention relates to a process for the production of polymeric materials and, more particularly, to the process for the production of copolymers of monoethenoid compounds.

The copolymerization of asymmetrical dichloroethylene with selected unsaturated compounds by methods heretofore disclosed in the literature is frequently attended with a number of disadvantages, among which are the following:

(1) Low rate of reaction, which entails economic losses due to low time-space yield.

(2) Difficulty in controlling the reaction. This is most frequently encountered in a bulk polymerization process in which no provision is made for conducting away the heat of reaction.

(3) The tendency to produce low molecular weight products which are usually characterized by undesirable physical properties. These difficulties are overcome by the present invention which, moreover, yields copolymers of asymmetrical dichloroethylene in a greater variety of useful forms than is possible by other methods of copolymerization.

This invention has as an object to produce a new and improved process for the copolymerization of dihalogenated ethylene, particularly asymmetrical dichloroethylene, with other unsaturated compounds. Another object is to produce a new and improved method for the copolymerization of asymmetrical dihalogenated ethylene with compounds having a single ethylenic double bond conjugated with a multiple bond between dissimilar atoms. Still another object is to provide a new and improved process for the production of copolymers of asymmetrical dichloroethylene with compounds having a single ethylenic double bond conjugated with a multiple bond between dissimilar atoms. Other objects will be apparent from the following description of the invention.

These objects are accomplished by the following invention which comprises emulsifying an asymmetrical dihalogenated ethylene in admixture with a compound containing a single ethylenic double bond conjugated with a multiple bond between dissimilar atoms, in an aqueous solution containing a dispersing agent whose activity is unaffected under mild acidity; e. g., of a pH of about 3 to about 5, and maintaining the resulting dispersion at a designated reaction temperature between about 20° C. and about 80° C. until polymerization is substantially complete.

The exact manner of practicing this invention may vary depending upon the particular compounds processed; however, the following will illustrate its application.

A mixture of asymmetrical dichloroethylene with from 5 to 50% by weight of a polymerizable compound having a single ethylenic double bond conjugated with a multiple bond between dissimilar atoms is emulsified by vigorous stirring in an aqueous medium containing about 1% to about 3% of a surface-active agent such as the sodium salt of acetoxyoctadecane sulfate and about 0.1 to 2% hydrogen peroxide. The aqueous medium preferably has a pH in the range of 2 to 4 and is used in such proportions that the ratio of the aqueous to the non-aqueous phase lies in the range of 2:1 and 3:1. The emulsion is placed in a pressure vessel constructed of glass, nickel, or stainless steel and provided with a means of agitation such as stirring or shaking. After the introduction of the emulsion, the air in the free space of the vessel is displaced by an inert gas such as nitrogen and the vessel is then closed. It is thereafter heated at a constant temperature in the range of about 40° to about 60° C. with constant or intermittent agitation until polymerization has proceeded to the desired extent. The specific gravity of the emulsion increases to a considerable extent as polymerization proceeds and determination of the specific gravity of samples withdrawn from the polymerization vessel at intervals affords a convenient means of observing the course of the reaction. It is usually necessary to standardize this method for a given monomer mixture/aqueous system by plotting the specific gravity against polymer content as determined by gravimetric analysis.

When polymerization has proceeded to the desired extent (usually 85 to 100%), the emulsion is withdrawn from the polymerization vessel and steam-distilled to remove any residual monomer. It is then diluted with about an equal volume of water and the resulting mixture heated to a temperature just below the point at which the polymer will form large clots when it is precipitated. The mixture is stirred rapidly and a solution of aluminum sulfate added in an amount sufficient to cause complete precipitation of the polymer. The mixture is rapidly stirred until any aggregates of particles have been completely broken up, and diluted with a large volume of cold water. The resulting polymer is then in the form of finely-divided, dense particles which settle rapidly and are readily filtered. The polymer is washed thoroughly with water to remove all traces of electrolyte and dispersing agent. In certain cases it is beneficial to give the polymer a final wash with a dilute solution of an alkaline reagent such as sodium hydroxide, ammonium hydroxide, sodium borate, and the like. This treatment assists in removing final traces of the dispersing agent and at the same time improves the heat stability of the polymer. To facilitate drying, the polymer may also be washed with alcohol. It is advisable to avoid high temperatures in the drying operation.

In the following examples the ingredient proportions are given as parts by weight unless otherwise stated.

*Example I*

A mixture of 42 parts of asymmetrical dichloroethylene, 8 parts of methyl methacrylate, and 8 parts of dibutyl phthalate is emulsified by vigorous agitation in a solution consisting of 75 parts of water, 1 part of 30% by volume hydrogen peroxide, 0.1 part of concentrated hydrochloric acid solution, and 4 parts of an approximately 50% solution of the sodium salt of acetoxyoctadecane sulfate. The mixture is heated in a glass vessel at 48° to 50° C. for approximately 64 hours. At the end of this time the specific gravity of the dispersion is 1.155. The dispersion is diluted with an equal volume of water, warmed to 60° C. and the polymer precipitated by the addition of aluminum sulfate solution. It is thoroughly washed with water and methanol, and then air-dried. A total of 50 parts of product is obtained. When pressed at 110° C. the polymer yields a light-colored, tough, flexible article.

*Example II*

A mixture of 30 parts of methyl methacrylate and 30 parts of asymmetrical dichloroethylene, 0.3 part of benzoyl peroxide and 0.1 part of epichlorohydrin is placed in a silver-lined autoclave along with a solution of 0.5 part of the sodium salt of an interpolymer of methacrylic acid with 50% methyl methacrylate, in 150 parts of water. The mixture is heated with vigorous agitation at 80° to 90° C. for a total of 8 hours. Under these conditions a polymer is produced in the form of fine granules which are readily filtered and washed with water. The dry product amounts to 50 parts. It is readily molded to a bar which deforms under pressure at 73° C.

*Example III*

A mixture of 65 parts of asymmetrical dichloroethylene and 35 parts of methoxyethyl methacrylate is emulsified by vigorous agitation in an aqueous medium consisting of 150 parts of water, 2 parts of 30% hydrogen peroxide, 0.2 part of concentrated hydrochloric acid, and 8 parts of a 50% solution of the sodium salt of acetoxyoctadecane sulfate. The mixture is then placed in a glass pressure vessel and heated at 50° C. with occasional agitation, for a total of 42 hours. At the end of this time the dispersion has a specific gravity of 1.15, and on precipitation as in Example I, yields 93 parts of polymer which by analysis contains 62.5% asymmetrical dichloroethylene.

*Example IV*

A mixture of 42 parts of asymmetrical dichloroethylene and 8 parts of isobutyl methacrylate is polymerized exactly according to the process described in Example I. The resulting dispersion shows a specific gravity of 1.15, and a total of 46 parts of polymer is obtained when the dispersion is treated as in Example I. The resulting polymer can be pressed to a light-colored, tough, flexible article. Analysis shows the product to contain 81% asymmetrical dichloroethylene.

*Example V*

A mixture of 28 parts of methyl acrylate and 22 parts of asymmetrical dichloroethylene is polymerized as in Example I, except that the total time of polymerization is 48 hours. Forty-three parts of polymer is isolated as in Example I. The product on pressing at 110° C. yields a light-colored, tough article which can be deformed by pressure at a temperature of approximately 50° C.

*Example VI*

A mixture of 70 parts of asymmetrical dichloroethylene and 30 parts of methyl vinyl ketone is emulsified by vigorous agitation in an aqueous system containing 150 parts of water, 2 parts of 30% hydrogen peroxide solution, 0.2 part of concentrated hydrochloric acid solution, and 8 parts of a 50% solution of the sodium salt of acetoxyoctadecane sulfate. The resulting emulsion is charged into a glass pressure vessel and heated with frequent agitation at 50° C. for a total of 67 hours. Sixty-eight parts of polymer are obtained by the procedure described in Example I. Analysis shows the polymer to contain 69% asymmetrical dischloroethylene. This product is readily molded to clear, light-colored, very tough articles.

*Example VII*

A mixture of 35 parts of asymmetrical dichloroethylene and 15 parts of methacrylonitrile is emulsified as in Example I and the resulting emulsion heated with occasional agitation in a glass pressure vessel at 50° to 55° C. for a total of 92 hours. From the resulting dispersion 20 parts of polymer is isolated as in Example I. This product is readily molded at 110° C. to yield a tough, light-colored article, which deforms under stress at 68° C.

*Example VIII*

A mixture of 30 parts of asymmetrical dichloroethylene, 12 parts of methyl methacrylate, and 8 parts of methyl vinyl ketone is emulsified as in Example I. The resulting emulsion is charged into a glass pressure vessel and heated at 50° to 52° C. for a total of 76 hours. On precipitation with aluminum sulfate solution the dispersion yields 46 parts of polymer which, when molded, produces very tough articles.

*Example IX*

A mixture of 75 parts of asymmetrical dichloroethylene and 25 parts of diethyl fumarate is emulsified by vigorous shaking in an aqueous medium containing 115 parts of water, 1 part of 30% hydrogen peroxide solution, 6 parts of a 50% solution of the sodium salt of acetoxyoctadecane sulfate, and 0.2 part of concentrated hydrochloric acid solution. The resulting emulsion is heated in a glass pressure vessel with occasional agitation for approximately 120 hours at 45° to 50° C. By the procedure of Example I, 84 parts of polymer is isolated from the resulting dispersion.

This invention comprehends the copolymerization of asymmetrical dihalogenated ethylenes, especially asymmetrical difluoro-, dichloro-, and dibromoethylenes. Among these compounds asymmetrical dichloroethylene is copolymerized most satisfactorily by the process of this invention, and is preferred. The other compounds with which the asymmetrical dihalogenated ethylene may be copolymerized are those having a single ethylenic double bond conjugated with a multiple bond between dissimilar atoms. Examples of such compounds include: methyl methacrylate, ethyl methacrylate, butyl methacrylate, octyl methacrylate, 2-nitro-2-methyl propyl methacrylate, methoxyethyl methacrylate, chloroethyl methacrylate, phenyl methacrylate, cyclohexyl methacrylate, and the corresponding esters of acrylic acid; acrylo- and methacrylonitrile, acryl- and methacrylamide or mono-alkyl substitution products thereof; methyl vinyl ketone, methyl isopropenyl ketone, phenyl vinyl ketone, diethyl fumarate, diethyl maleate, methylene diethyl malonate, and the like. It is preferred that these ingredients shall constitute from 5 to 50% of the total polymerizable material. It is apparent that the properties of the copolymers will depend largely on the type and amount of the non-vinylidine chloride constituents. It is within the scope of this invention to copolymerize vinylidene chloride with two or more compounds having a single ethylenic double bond conjugated with a multiple bond between dissimilar atoms.

Dispersing or surface-active agents are frequently divided into four classes depending on which portion of the molecule contains the active group. These four classes are the following: anionic (exemplified by ordinary soaps), cationic (examplified by cetyl pyridinium bromide), hybrid (exemplified by betaine-type compounds), non-ionic (exemplified by the products obtained in the reaction of long-chain alcohols with ethylene oxide). Any of these types of dispersing agents may be used in the emulsion copolymerization of asymmetrical dihalogenated ethylene according to the present invention, provided they are not decomposed under the conditions employed. Sodium, potassium, and ammonium salts of long-chain aliphatic carboxylic acids are not suitable because of the ease with which they are decomposed by acids. Suitable agents include: sodium dodecyl sulfate, the triethanolamine salt of dodecyl sulfate, sodium cetyl sulfate, sodium myristyl sulfate, sodium stearyl sulfate, sodium oleyl sulfate, sodium acetoxyoctadecane sulfate, the sodium salt of sulfonated isopropylated naphthalene, sulfonated paraffin oil prepared as described in patent application Serial No. 352,797, filed August 15, 1940, C-cetyl betaine, hydroxypropyl C-cetyl betaine, dodecyl trimethyl ammonium bromide, stearyl trimethylammonium bromide, the diethyl cyclohexylamine salt of cetyl sulfuric ester, sodium tetradecane-1 sulfonate, tetramannitan monopalmitate, partially saponified polyvinyl acetate, the sodium salt of methacrylic acid/methyl methacrylate interpolymer, and the like. In general, from about 0.5% to about 5% solutions of these active agents are used as the dispersing media in the copolymerization of asymmetrical dichloroethylene. Since certain of these agents show less activity than others, it will be understood that the amount of dispersant used will depend to some extent on the surface activity of the material. The type of agitation also plays a considerable part in determining the amount of dispersing agent to be used, since with very rapid agitation it is possible to use less dispersant than in cases in which agitation is slow or intermittent. It will of course be understood that the surface-active agents to which reference is made above are commercial materials which, because of the methods of preparation used or because of the sources from which they are derived, are usually not produced in high state of purity and ordinarily contain small amounts of electrolytes, unreacted starting materials, and other substances. It is to be understood that when reference is made in the claims to the use of definite percentages of dispersing agents, these values are calculated on the basis of the known active ingredients concentration in the commercial dispersants.

While most of the examples have shown the use of hydrogen peroxide as the catalyst, it is not intended that this invention be restricted to the use of hydrogen peroxide alone. Both water-soluble or organic-soluble catalysts may be employed, if desired. Specific examples include: acetyl benzoyl peroxide, dibutyryl peroxide, lauroyl peroxide, benzoyl peroxide, acetyl peroxide, sodium peroxide, sodium peracetate or peracetic acid, succinyl peroxide, sodium perborate, and the like.

The emulsion copolymerization of asymmetrical dihalogenated ethylene may be carried out in aqueous media whose pH is less than about 5. However, since the copolymerization generally proceeds more slowly in environments of low acidity and since high acidity may cause excessive corrosion of the polymerization vessel, it is preferred that the copolymerization be carried out at a pH of about 2 to 4. Frequently, as copolymerization proceeds the aqueous medium may become more acid, particularly if the initial pH is in the range of approximately 4 to 5. If it is desired to avoid changes in pH during the course of the copolymerization, buffer mixtures may be added to the aqueous medium.

There is a wide permissible variation in the amount of aqueous medium which may be employed for dispersing a given weight of monomer mixture. Thus, the ratio of aqueous phase to non-aqueous phase may vary between approximately 10:1 and 1:1. This aqueous/non-aqueous ratio plays a considerable role in determining the molecular weight of the copolymer produced, the higher ratios generally favoring the production of lower molecular weight polymers. In general, it is preferred that the aqueous/non-aqueous ratio shall be between approximately 4:1 to 1:1, since for a given reaction vessel the time-space yield is greatly reduced by the employment of higher ratios. Usually with a 1:1 ratio it is necessary to use somewhat more emulsifying agent than is used with the higher aqueous/non-aqueous ratios.

The temperature employed in bringing about the copolymerization of asymmetrical dihalogenated ethylene may vary between about 20° C. and about 80° C. Lower temperatures tend to favor the production of very high molecular weight polymers but may be too time-consuming to be practicable, whereas at higher temperatures the aqueous medium may have an adverse effect on the physical properties of the copolymers. It is preferred to employ temperatures in the range of 30° C. to 60° C.

Any method of agitation may be employed in producing and maintaining the emulsions. The most commonly employed method of mixing is stirring, preferably in vessels containing suitable baffles. Other methods include shaking, tumbling, and the use of turbo-mixers. The amount of agitation required to produce and maintain the emulsion will depend primarily on the type of emulsifying agent employed. With certain systems vigorous agitation need be employed only at the outset, the resulting emulsions being so stable as to require little or no agitation thereafter. With certain other emulsifying agents it is necessary to maintain vigorous agitation throughout the course of the polymerization reaction. Up to a certain point agitation has a favorable effect on the rate of polymerization; however, when the majority of the emulsified particles have reached submicroscopic size further agitation appears to have little effect on the rate of copolymerization.

While the presence of oxygen in the copolymerization vessel does not appear to have a deleterious effect on the properties of the asymmetrical dihalogenated ethylene copolymers, it does adversely affect the rate of polymerization. It is therefore preferable to displace the air from the polymerization vessel by means of a gas which does not reduce the rate of copolymerization. Suitable gases include nitrogen, carbon dioxide, methane, and helium. These gases may be passed through the free space of the polymerization vessel until the air has been completely displaced, or may be introduced under sufficiently high pressure that the oxygen originally present is so greatly diluted as to have little effect on the rate of polymerization.

It is important that the material used in the construction of the reaction vessel shall be one which has no effect on the rate of polymerization or on the quality of the copolymers and is not affected by the aqueous medium used in carrying out the polymerization. The use of ordinary steel vessels should be avoided, since they are attacked by the aqueous medium and further adversely influence the rate of polymerization and the properties of the copolymers. Copper is likewise unsuitable. However, the stainless steel commonly designated as 18 and 8 is suitable. Suitable vessels may also be constructed from nickel, silver, or lead. Vessels equipped with glass or enamel liners may also be used. For most polymerizations, vessels capable of withstanding pressures up to about 400 lbs./sq. in. may be safely employed.

It may be found in copolymerizing asymmetrical dihalogenated ethylene with a compound having a single ethylenic double bond conjugated with a multiple bond between dissimilar atoms, that one of the monomeric materials polymerizes more rapidly than the other, thus giving rise to products which may be characterized by non-homogeneity (opacity) and other inferior physical properties. To avoid these effects the polymerization procedure may be so modified that all of the more slowly polymerizing material is initially added to the aqueous medium along with a small portion of the more rapidly polymerizing monomer, and thereafter additions of portions of the more rapid monomer are made at about the rate at which this material is used up.

The emulsion process is adapted to be carried out continuously. Thus, the monomer mixture and aqueous phases may be passed at appropriate rates into a centrifugal mixer from which the emulsion is conducted into a heated tube of such dimensions that when the emulsion has reached the end of the tube, polymerization is substantially complete. The end of the tube is equipped with a valve through which the emulsion is drawn at the appropriate rate.

At the conclusion of polymerization the asymmetrical dihalogenated ethylene copolymers may be isolated as finely divided powders by a variety of methods. For example, the dispersion may be sprayed into a heated and/or evacuated chamber whereby the water is removed as vapor and the polymer falls to the bottom of the chamber. The polymer may also be isolated by cooling the dispersion below the freezing point of the aqueous medium, or by the addition of a large volume of a lower aliphatic alcohol such as methanol or ethanol. The most satisfactory method consists in adding the appropriate amount of an electrolyte solution to the diluted aqueous dispersion with rapid agitation at a temperature just below the point at which the precipitated particles tend to cohere. This procedure yields a polymer in the form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride, and aluminum sulfate. After precipitation of the polymer it is filtered and washed repeatedly with water to remove traces of electrolyte and dispersing agent which may adhere to the particles. Washing with dilute solutions (0.1 to about 1%) of caustic soda or ammonium hydroxide assists in the removal of last traces of dispersing agent and at the same time yields polymers of improved heat stability. In order to facilitate low temperature drying of the polymers it is beneficial to employ a final wash with a lower aliphatic alcohol such as methanol or ethanol. Before precipitation it may be advantageous to add to the dispersion small amounts of heat stabilizers such as those cited in application Serial No. 220,010, filed July 19, 1938, (U. S. Patent No. 2,278,415) and/or small amounts of plasticizers such as dibutyl phthalate, tricresyl phosphate, and dibutyl sebacate.

In cases in which the copolymers are to be used as coating or impregnating agents for porous materials, it is possible to apply the emulsions directly to the material to be coated without the intermediate isolation of the polymer.

Copolymers prepared according to the present invention may be used for the preparation of plastics, coatings, fibers, foils, films and adhesives. For any of these purposes, the interpolymers may be combined with or prepared in the presence of plasticizers, stabilizers, fillers, pigments, dyes, softeners, natural resins, or other synthetic resins.

As many apparently widely different embodiments of this invention may be made without departing from the spirit and scope thereof, it is to be understood that this invention is not intended to be limited to the specific embodiments thereof except as defined in the appended claims.

I claim:

1. A polymerization process which comprises emulsifying a mixture of asymmetrical dichlorethylene with methyl methacrylate in an aqueous solution at a pH ranging from about 2-4 and containing a dispersing agent selected from the group consisting of alkali metal salts of long chain sulfates and sulfonates and an oxygen-yielding polymerization catalyst, employing in said mixture an amount of methyl methacrylate, by weight, ranging from 5-50% of the total polymerizable materials present and an aqueous-non-aqueous phase ratio in said solution of from 4:1 to 1:1, and maintaining the resulting emulsion at a temperature between about 30-60° C. until polymerization becomes effected.

2. A polymerization process which comprises emulsifying a mixture of asymmetrical dichlorethylene with methyl vinyl ketone in an aqueous solution at a pH ranging from about 2-4 and containing a dispersing agent selected from the group consisting of alkali metal salts of long chain sulfates and sulfonates and an oxygen-yielding polymerization catalyst, employing in said mixture an amount of methyl vinyl ketone, by weight, ranging from 5-50% of the total polymerizable material present and an aqueous-non-aqueous phase ratio in said solution of from 4:1 to 1:1, and maintaining the resulting emulsion at a temperature between about 30-60° C. until polymerization becomes effected.

3. A polymerization process which comprises emulsifying a mixture of asymmetrical dichlorethylene with acrylonitrile in an aqueous solution at a pH ranging from about 2-4 and containing a dispersing agent selected from the group consisting of alkali metal salts of long chain sulfates and sulfonates and an oxygen-yielding polymerization catalyst, employing in said mixture an amount of acrylonitrile, by weight, ranging from 5-50% of the total polymerizable materials present and an aqueous-non-aqueous phase ratio in said solution of 4:1 to 1:1 and maintaining the resulting emulsion at a temperature between about 30-60° C. until polymerization becomes effected.

4. A polymerization process which comprises emulsifying a mixture of asymmetrical dihalogenated ethylene and a polymerizable compound from the group consisting of esters, nitriles, amides and ketones containing a single ethylenic double bond conjugated with a multiple bond between dissimilar atoms, in an aqueous solution at a pH ranging from 2-5 having a ratio of aqueous to non-aqueous phase of from 10:1 to 1:1 and containing a dispersing agent selected from the group consisting of alkali metal salts of long chain sulfates and sulfonates and an oxygen-yielding catalyst, employing in said mixture an amount of said polymerizable compound by weight ranging from 5-50% of the total polymerizable materials present and maintaining the resulting emulsion at a temperature between about 20-80° C. until polymerization becomes effected.

5. A polymerization process which comprises emulsifying a mixture of asymmetrical dichloroethylene and a polymerizable compound from the group consisting of esters, nitriles, amides and ketones containing a single ethylenic double bond conjugated with a multiple bond between dissimilar atoms, in an aqueous solution at a pH ranging from 2-5 having a ratio of aqueous to non-aqueous phase of from 10:1 to 1:1 and containing a dispersing agent selected from the group consisting of alkali metal salts of long chain sulfates and sulfonates and an oxygen-yielding catalyst, employing in said mixture an amount of said polymerizable compound by weight ranging from 5-50% of the total polymerizable materials present and maintaining the resulting emulsion at a temperature between about 20-80° C. until polymerization becomes effected.

6. The process in accordance with claim 5 characterized in that the dispersing agent is present in an amount of about 0.2 to about 4% by weight of the aqueous system.

7. The process in accordance with claim 5 characterized in that the catalyst is present in an amount of about 0.05 to about 3% by weight of the mixture to be polymerized.

DANIEL E. STRAIN.